United States Patent [19]
Otawa et al.

[11] Patent Number: 5,270,377
[45] Date of Patent: Dec. 14, 1993

[54] THERMOPLASTIC RESIN COMPOSITION CONTAINING GRAFT-MODIFIED POLYOLEFIN ELASTOMER AND A POLYAMIDE

[75] Inventors: Yasuhiko Otawa; Noboru Sakamaki; Tetsuo Tojo, all of Ichihara; Katsuo Okamoto, Funabashi; Toshiyuki Maeda, Ichihara, all of Japan

[73] Assignee: Mitsui Petrochemical Industries, Ltd., Tokyo, Japan

[21] Appl. No.: 962,710

[22] Filed: Oct. 19, 1992

Related U.S. Application Data

[60] Division of Ser. No. 873,624, Apr. 23, 1992, Pat. No. 5,237,003, which is a continuation of Ser. No. 759,609, Sep. 16, 1991, abandoned, which is a continuation of Ser. No. 443,827, Dec. 1, 1989, abandoned, which is a continuation of Ser. No. 115,044, Oct. 30, 1987, abandoned.

[30] Foreign Application Priority Data

Oct. 30, 1986 [JP] Japan ............................... 61-256871
May 18, 1987 [JP] Japan ............................... 62-118942

[51] Int. Cl.$^5$ ............................................. C08L 77/00
[52] U.S. Cl. ........................................ 524/504; 525/66
[58] Field of Search .......................... 525/66; 524/504

[56] References Cited

U.S. PATENT DOCUMENTS

| | | | |
|---|---|---|---|
| 4,174,358 | 11/1979 | Epstein | 525/66 |
| 4,212,787 | 7/1980 | Matsuda et al. | 525/211 |
| 4,594,386 | 1/1986 | Olivier | 525/66 |
| 4,670,515 | 6/1987 | Olivier | 525/285 |

FOREIGN PATENT DOCUMENTS

| | | |
|---|---|---|
| 53-108142 | 9/1978 | Japan . |
| 8246 | 1/1982 | Japan . |
| 58-206667 | 12/1983 | Japan . |
| 49018 | 3/1985 | Japan . |
| 118735 | 6/1985 | Japan . |
| 74943 | 4/1987 | Japan . |

*Primary Examiner*—Ana L. Carrillo
*Attorney, Agent, or Firm*—Sherman and Shalloway

[57] ABSTRACT

In the case where a polyamide is blended with a specific partially crosslinked graft-modified polyolefin elastomer obtained by dynamically heat-treating a blend of a peroxide-crosslinking olefin copolymer rubber and an olefinic plastic with an unsaturated carboxylic acid or derivative thereof, an unsaturated epoxy monomer or an unsaturated hydroxy monomer in the presence of an organic peroxide, if the graft-modified polyolefin plastomer occupies a major portion, a composition excellent in the oil resistance, the mechanical strength and the resistance against heat aging is obtained and if the polyamide occupies a major portion, a composition excellent in the impact resistance, the rigidity and the tensile strength is obtained.

9 Claims, No Drawings

THERMOPLASTIC RESIN COMPOSITION CONTAINING GRAFT-MODIFIED POLYOLEFIN ELASTOMER AND A POLYAMIDE

This application is a division of allowed application Ser. No. 07/873,624 filed Apr. 23, 1992, now U.S. Pat. No. 5,237,003; which was a continuation of application Ser. No. 07/759,609, filed Sep. 16, 1991, now abandoned; which was a continuation of application Ser. No. 07/443,827, filed Dec. 1, 1989, now abandoned; which was a continuation of application Ser. No. 07/115,044, filed Oct. 30, 1987, now abandoned.

BACKGROUND OF THE INVENTION

1. Field of the Invention

The present invention relates to a composition comprising a graft-modified polyolefin type elastomer and a polyamide. More particularly, the present invention relates to a resin composition comprising a blend of (a) a graft-modified polyolefin type elastomer and (b) a polyamide, said graft-modified polyolefin type elastomer being partially crosslinked by dynamically heat-treating a mixture of a peroxide-crosslinkable olefin copolymer rubber and an olefinic plastic with an unsaturated carboxylic acid or derivative thereof, an unsaturated epoxy monomer or an unsaturated hydroxy monomer in the presence of an organic peroxide.

2. Description of the Prior Art

A thermoplastic elastomer has been known as an energy-saving and resource-saving substitute for a cured rubber, and it has been used as automobile parts (bellows, tubes, interior sheets and mudguards), industrial machine parts (pressure-resistant hoses, gaskets and diaphragms), electronic and electric machine parts and construction materials.

As the thermoplastic elastomer, a composition comprising a crystalline thermoplastic polyolefin resin and a cured ethylene/propylene/polyene copolymer rubber is disclosed in Japanese Patent Publication No. 46138/83 or Japanese Patent Publication No. 18448/80. This composition, however, is defective in that the balance between the rubbery elasticity and the mechanical strength is bad.

Furthermore, a thermoplastic elastomer composition comprising a blend of an ethylene/propylene/polyene copolymer rubber, an acrylonitrile/butadiene copolymer rubber, a polypropylene resin and a nylon resin is known from U.S. Pat. No. 4,338,413. This composition has a high oil resistance and other good properties, but the composition is fatally defective in that the resistance against heat aging and the weatherability are poor.

Furthermore, a composition comprising a modification product of a mixture of a polyolefin resin and an ethylene/$\alpha$-olefin copolymer with an $\alpha$, $\beta$-unsaturated carboxylic acid and a polyamide is known from Japanese Patent Application Laid-Open Specification No. 8246/82. This composition is excellent in the mechanical strength, but is poor in the softness, which is one of important properties required for the thermoplastic elastomer.

Namely, a thermoplastic elastomer composition excellent in the oil resistance, the mechanical strength and the resistance against heat againg has not been developed, so far as we know.

A large demand is expected for a polyamide resin as an engineering plastic because the resin has excellent physical properties. However, the polyamide resin is generally insufficient in such properties as the impact resistance at low temperatures, the water resistance and the salt water resistance, and it is desired that these properties will be improved. As the means for improving impact resistance characteristics, prior art references such as Japanese Patent Publication No. 12546/67, Japanese Patent Publication No. 44108/80, Japanese Patent Application Laid-Open Specification No. 9962/80 propose methods in which a modified $\alpha$-olefin elastic copolymer such as an ethylene/$\alpha$-olefin copolymer grafted with an $\alpha,\beta$-unsaturated carboxylic acid is incorporated into a polyamide resin. The compositions proposed in these prior art references are defective in that if the impact resistance characteristics such as the Izod impact strength are improved, the rigidity is drastically reduced, the falling weight impact strength at low temperatures is insufficient, and practical molded articles having a high rigidity and a high impact strength can hardly be obtained from these compositions. Furthermore, the melt flowability is often reduced excessively, and the compositions are defective in that the moldability and processability are degraded in some molding methods.

As a composition in which the foregoing defects are eliminated, that is, a polyamide composition in which the impact resistance and the rigidity are well-balanced, there is proposed a resin composition comprising a polyamide resin and a modified polyolefin obtained by grafting an ethylene/$\alpha$-olefin copolymer having a crystallinity lower than 35%, which is obtained by using a specific catalyst, with an unsaturated carboxylic acid or a derivative thereof (see Japanese Patent Application Laid-Open Specification No. 147008/84). However, even if this specific modified polyolefin is used, the improvements of the rigidity, the tensile strength and the like are still insufficient.

SUMMARY OF THE INVENTION

We found that in the case where a polyamide is blended with a specific partially crosslinked graft-modified poly-olefin elastomer obtained by dynamically heat-treating a blend of a peroxide-crosslinkable olefin copolymer rubber and an olefinic plastic with an unsaturated carboxylic acid or derivative thereof or an unsaturated epoxy monomer or an unsaturated hydroxy monomer in the presence of an organic peroxide, if the graft-modified polyolefin elastomer occupies a major portion, a composition excellent in the oil resistance, the mechanical strength and the resistance against heat aging is obtained and if the polyamide occupies a major portion, a composition excellent in the impact resistance, the rigidity and the tensile strength is obtained. We have now completed the present invention based on this finding.

More specifically, in accordance with the present invention, there is provided a thermoplastic resin composition which comprises (a) a partially crosslinked graft-modified polyolefin elastomer obtained by dynamically heat-treating a blend comprising (i) 10 to 100 parts by weight of a peroxide-crosslinkable olefin copolymer rubber, (ii) 0 to 90 parts by weight of an olefinic plastic, the sum of the amounts of the components (i) and (ii) being 100 parts by weight, and (iii) 0.01 to 10 parts by weight of at least one monomer selected from the group of ① an unsaturated carboxylic acid or derivative thereof, ② an unsaturated epoxy monomer and ③ an unsaturated hydroxy monomer in the presence of an organic peroxide, and (b) a polyamide.

In accordance with one preferred embodiment of the present invention, there is provided a thermoplastic resin composition as set forth above, wherein the amount of the graft-modified polyolefin elastomer (a) is larger than 50 parts by weight but up to 95 parts by weight and the amount of the polyamide (b) is from 5 to less than 50 parts by weight, the sum of the amounts of the components (a) and (b) being 100 parts by weight.

In accordance with another embodiment of the present invention, there is provided a thermoplastic resin composition as set forth above, wherein the amount of the graft-modified polyolefin elastomer (a) is from 5 to less than 50 parts by weight and the amount of the polyamide (b) is larger than 50 parts by weight but up to 95 parts by weight, the sum of the amounts of the components (a) and (b) being 100 parts by weight.

In accordance with still another preferred embodiment of the present invention, there is provided a thermoplastic resin composition as set forth above, wherein the graft-modified polyolefin elastomer or a blend comprising (i), (ii) and (iii) before dynamically heat treated further comprises (iv) 0 to 100 parts by weight of a peroxide-non-crosslinkable rubbery substance and/or (v) 0 to 200 parts by weight of a mineral oil type softener, per 100 parts by weight of the sum of the amounts of the components (i) and (ii), per 100 parts by weight of the sum of the amounts of the components (i) and (ii).

Namely, the thermoplastic resin composition of the present invention is prominently characterized in that the elastomer component to be blended in the polyamide is a partially crosslinked graft-modified polyolefin elastomer obtained by dynamically heat-treating a mixture of a peroxide-crosslinkable olefin copolymer rubber and an olefinic plastic with an unsaturated carboxylic acid or derivative thereof, an unsaturated epoxy monomer or an unsaturated hydroxy monomer in the presence of an organic peroxide. In the resin composition of the present invention, if the elastomer component occupies a major portion, the oil resistance, the mechanical strength and the resistance against heat aging are highly improved, and if the polyamide component occupies a major portion, the rigidity, the impact strength, the flowability and the heat resistance are highly improved.

DETAILED DESCRIPTION OF THE PREFERRED EMBODIMENTS

In the embodiment of the present invention where the modified polyolefin elastomer occupies a major portion of the composition, since the modified polyolefin elastomer as the component (a) is composed of a partially crosslinked olefin copolymer and an olefinic plastic, preferably a peroxide-decomposing olefinic plastic, the component (a) maintains the flowability, the heat resistance and the resistance against heat aging at high levels and imparts a good rubbery elasticity to the composition.

The polyamide as the component (b) imparts a good oil resistance and a good flowability at a high temperature, and the oil resistance and moldability of the composition can be maintained at predetermined levels.

The reason why the merits of the components (a) and (b) are sufficiently exerted in the thermoplastic elastomer composition of the present invention is that the component (a) is uniformly modified with the unsaturated carboxylic acid or derivative thereof, the unsaturated epoxy monomer or the unsaturated hydroxy monomer, which easily forms a physical or chemical bonding to the component (b), and the strength of the interface of the blend is greatly increased as compared with the case where the component (a) is in the unmodified state or a third component having a segment compatible with the components (a) and (b), is incorporated.

As is apparent from the foregoing description, in the present embodiment, by the actions of the respective components, a thermoplastic resin composition excellent in the oil resistance, the mechanical strength and the resistance against heat aging can be provided.

In another embodiment of the present invention where the polyamide occupies a major portion, the modified polyolefin elastomer as the component (a) exerts a function of imparting a high impact strength, a good flowability and a high heat resistance.

The polyamide as the component (b) exerts the function of imparting a high rigidity, a high heat resistance and a good flowability at a high temperature.

As is apparent from the foregoing description, in the present embodiment, a thermoplastic resin composition excellent in the rigidity, the impact resistance and the heat resistance is provided.

The respective components of the thermoplastic elastomer composition of the present invention will now be described.

(i) Peroxide-Crosslinkable Olefin Copolymer Rubber

The peroxide-crosslinkable olefin copolymer rubber used in the present invention is an amorphous elastic copolymer comprising an olefin as the main component, such as an ethylene/propylene copolymer rubber, an ethylene/propylene/non-conjugated diene rubber and an ethylene/butadiene copolymer rubber, and this rubber is characterized by having such a property that if the rubber is mixed with an organic peroxide and kneaded under heating, the flowability is reduced or lost altogether. As the non-conjugated diene, there can be mentioned dicyclopentadiene, 1,4-hexadiene, dicyclooctadiene, methylene-norbornene and 5-ethylidene-2-norbornone.

Of these copolymer rubbers, an ethylene/propylene copolymer rubber and an ethylene/propylene/non-conjugated diene rubber are preferably used, and a copolymer rubber in which the molar ratio between ethylene units and propylene units (ethylene/propylene molar ratio) is from 50/50 to 90/10, especially from 55/45 to 85/15, is preferred. An ethylene/propylene/non-conjugated diene copolymer rubber, particularly an ethylene/propylene/5-ethylidene-2-norbornene copolymer rubber or an ethylene/propylene/5-ethylidene-2-norbornene/dicyclopentadiene quadripolymer, is especially preferred because a thermoplastic elastomer excellent in heat resistance, tensile characteristics and repulsion elasticity can be obtained.

In order to obtain a composition excellent in the tensile characteristics and flowability, it is preferred that the Mooney viscosity $ML_{1+4}$ (100° C.) of the copolymer rubber be 10 to 120, especially 40 to 80.

It also is preferred that the iodine value (unsaturation degree) of the copolymer rubber be smaller than 16. If this requirement is satisfied, a thermoplastic elastomer which is well-balanced between the flowability and the rubbery properties can be obtained.

(ii) Olefinic Plastic

The olefinic plastic as the component (b) is a crystalline high-molecular-weight solid product obtained by polymerizing at least one mono-olefin according to the high-pressure method or low-pressure method.

For example, there can be mentioned isotactic and syndiotactic mono-olefin homopolymer and copolymer resins, and typical mono-olefin polymer resins are commercially available.

As preferred examples of the monoolefin, there can be mentioned ethylene, 1-butene, 1-pentene, 1-hexene, 2-methyl-1-propene, 3-methyl-1-pentene, 4-methyl-1-pentene and 5-methyl-1-hexene.

In the present invention, a peroxide-decomposing olefinic plastic and polyethylene are especially preferred as the olefinic plastic.

By the peroxide-decomposing olefinic plastic is meant an olefinic plastic having such a property that if the olefinic plastic is mixed with a peroxide and kneaded under heating, the molecular weight is decreased by thermal decomposition and the flowability of the resin is increased. For example, there can be mentioned isotactic polypropylene and copolymers of propylene with a minor amount of other α-olefin, such as a propylene/ethylene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, especially 5 to 20. In the present invention, the olefinic plastic exerts the effects of improving the flowability and heat resistance of the composition.

(iii) Unsaturated Carboxylic Acid or Derivative thereof or Unsaturated Epoxy Monomer or Saturated Hydroxy Monomer In the present invention, as the unsaturated carboxylic acid or derivative thereof as the component (iii), there can be used α,β-unsaturated carboxylic acids such as acrylic acid, methacrylic acid, maleic acid, fumaric acid, itaconic acid, citraconic acid, tetrahydrophthalic acid and bicyclo(2,2,1)hept-2-ene-5,6-dicarboxylic acid, unsaturated carboxylic anhydrides such as maleic anhydride, itaconic anhydride, citraconic anhydride, tetrahydrophthalic anhydride and bicyclo(2,2,1)hept-2-ene-5,6-dicarboxylic anhydride, and unsaturated carboxylic acid esters such as methyl acrylate, methyl methacrylate, dimethyl maleate, monomethyl maleate, diethyl fumarate, dimethyl itaconate, diethyl citraconate, dimethyl tetrahydrophthalate and dimethyl bicyclo(2,2,1)hept-2-ene-5,6-dicarboxylate. Of these compounds, maleic acid, bicyclo(2,2,1)hept-2-ene-5,6-dicarboxylic acid and anhydrides thereof are preferred.

As the unsaturated epoxy monomer used as the component (iii) in the present invention, there can be mentioned, for example, glycidyl esters of unsaturated monocarboxylic acids such as glycidyl acrylate, glycidyl methacrylate and glycidyl p-styrylcarboxylic acid, monoglycidyl and diglycidyl esters of unsaturated polycarboxylic acids such as maleic acid, itaconic acid, citraconic acid, butene-tricarboxylic acid, endo-cis-bicyclo(2,2,1)hept-5-ene-2,3-dicarboxylic acid and endo-cis-bicyclo(2,2,1)hept-5-ene-2-methyl-2,3-dicarboxylic acid, unsaturated glycidyl ethers such as allylglycidyl ether, 2-methylallylglycidyl ether, o-allylphenol glycidyl ether, m-allylphenol glycidyl ether, m-allylphenol glycidyl ether, p-allylphenol glycidyl ether, isopropenylphenol glycidyl ether, o-vinylphenol glycidyl ether, m-vinylphenol glycidyl ether and p-vinylphenol glycidyl ether and 2-(o-vinylphenyl)-ethylene oxide, 2-(p-vinylphenyl)-ethylene oxide, 2-(o-vinylphenyl)-propylene oxide, 2-(p-vinylphenyl)-propylene oxide, 2-(o-allylphenyl)-ethylene oxide, 2-(p-allylphenyl)-ethylene oxide, 2-(o-allylphenyl)-propylene oxide, 2-(p-allylphenyl)-propylene oxide, p-glycidylstyrene, 3,4-epoxy-1-butene, 3,4-epoxy-3-methyl-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene mono-oxide and allyl-2,3-epoxycyclopentyl ether.

The unsaturated hydroxy monomer as another component (iii) is a monomer having at least one ethylenic unsaturated bond and at least one hydroxyl group. For example, there can be mentioned hydroxyethyl acrylate, hydroxypropyl acrylate, hydroxyethyl methacrylate, hydroxypropyl methacrylate, polyethylene glycol monomethacrylate and polypropylene glycol monomethacrylate. Hydroxyethyl (meth)acrylate and hydroxypropyl (meth)acrylate are especially preferred.

The component (iii) acts as a grafting modifier at the dynamic heat treatment described hereinafter to reinforce the blend interface between the polyamide and the graft-modified polyolefin elastomer and improve the impact resistance of the thermoplastic resin composition.

In the present invention, the graft-modified polyolefin elastomer or a blend comprising (i), (ii) and (iii) before the dynamic heat treatment may further comprises (iv) a peroxide-non-crosslinkable rubbery substance and/or (v) a mineral oil type softener.

(iv) Peroxide-Non-Crosslinkable-Rubbery Substance

A hydrocarbon type rubbery substance having such a property that even if the rubbery substance is mixed with a peroxide and kneaded under heating, the rubbery substance is not crosslinked and the flowability is not reduced is used as the peroxide-non-crosslinkable rubbery substance (iv). For example, there can be mentioned polyisobutylene, butyl rubber, a propylene/ethylene copolymer rubber having a propylene content of at least 70 mole % and atactic polypropylene. In view of the performance and the handling easiness, polyisobutylene is especially preferred as the component (iv).

The component (iv) exerts a function of improving the flowability of the thermoplastic resin composition. It is preferred that the Mooney viscosity of the component (iv) be lower than 60.

(v) Mineral Oil Type Softener

The mineral oil type softener as the component (v) is a high-boiling-point petroleum fraction ordinarily used for weakening the intermolecular force of a rubber in roll processing of the rubber to facilitate the processing, assisting the dispersion of carbon black or white carbon incorporated as the filler, or reducing the hardness of a cured rubber to increase the softness and elasticity, and this fraction includes a paraffin type, a naphthene type and an aromatic type.

Graft-Modified Polyolefin Elastomer (a)

According to the present invention, the graft-modified polyolefin elastomer (a) is prepared by blending (i) 10 to 100 parts by weight, preferably 10 to 95 parts by weight, especially preferably 60 to 95 parts by weight, of the peroxide-crosslinkable olefin copolymer rubber, (ii) 0 to 90 parts by weight, preferably 5 to 90 parts by weight, especially preferably 5 to 40 parts by weight, of the olefinic plastic, the sum of the amounts of the components (i) and (ii) being 100 parts by weight and (ii) 0.01 to 10 parts by weight, especially 0.1 to 5 parts by weight, of the unsaturated carboxylic acid or derivative thereof, the unsaturated epoxy monomer or the unsaturated hydroxy monomer and dynamically heat-treating the blend in the presence of an organic peroxide to effect partial crosslinking.

If the copolymer rubber component (i) is used in an amount within the above-mentioned range, a composition excellent in rigidity, flowability, heat resistance and impact resistance can be obtained.

If the olefinic plastic (ii) is incorporated in an amount within the above-mentioned range, a composition excellent in impact resistance, flowability and moldability can be obtained.

The impact resistance and flowability can be improved if the unsaturated carboxylic acid or derivative thereof, the unsaturated epoxy monomer or the unsaturated hydroxy monomer (iii) is used in an amount within the above-mentioned range.

In the present invention, it is preferred that the components (iv) and (v) be incorporated at the blending step. Namely, it is preferred that the peroxide-non-crosslinkable rubbery substance (iv) be incorporated in an amount of 0 to 100 parts by weight, preferably 5 to 100 parts by weight, especially preferably 5 to 50 parts by weight, and the mineral oil type softener (v) be incorporated in an amount of 0 to 200 parts by weight, preferably 3 to 100 parts by weight, especially preferably 5 to 80 parts by weight, per 100 parts by weight of the sum of the amounts of the components (i) and (ii).

A filler or colorant can be incorporated in the thermoplastic resin composition, so far as the flowability (moldability) and the impact resistance characteristics of the final composition are not degraded. As the filler, there can be mentioned calcium carbonate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, shirasu balloon and carbon fiber, and as the colorant, there can be mentioned carbon black, titanium oxide, zinc flower, red iron oxide, ultramarine, prussian blue, an azo pigment, a nitroso pigment, a lake pigment and a phthalocyanine pigment.

Furthermore, in the present invention, known heat stabilizers such as phenol type, sulfite type, phenylalkane type, phosphite type and amine type stabilizers, aging-preventing agents, weathering agents, antistatic agents, and lubricants such as metal soaps and waxes can be incorporated in amounts customarily used for olefinic plastics or olefin copolymer rubbers.

In the present invention, the blend comprising the above-mentioned components is dynamically heat-treated in the presence of an organic peroxide to effect partial crosslinking and prepare a modified polyolefin elastomer (a). By the dynamic heat treatment is meant kneading in the molten state.

As the organic peroxide used in the present invention, there can be mentioned dicumyl peroxide, di-tert-butyl peroxide, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1-bis(tert-butylperoxy)-3,3,5-trimethylcyclohexane, n-butyl-4,4-bis(-tert-butylperoxy)valelate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these peroxides, in view of the smell and scorch stability, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1bis(tert-butylperoxy)-3,5-trimethylcyclohexane and n-butyl-4,4bis(-tert-butylperoxy)valelate are preferred, and 1,3-bis(tert-butylperoxyisopropyl)benzene is most preferred.

The organic peroxide is incorporated in an amount of 0.05 to 3% by weight, especially 0.1 to 1% by weight, based on the total amount of the components (i), (ii) and (iii).

If the amount of the organic peroxide is within the above mentioned range, the obtained composition has excellent impact resistance, heat resistance and flowability.

Known kneading devices such as an open mixing roll, a closed Banbury mixer, an extruder, a kneader and a continuous mixer can be used.

It is preferred that kneading be carried out in a closed apparatus in an atmosphere of an inert gas such as nitrogen or carbon dioxide gas. The kneading temperature is such that the half-value period of the used organic peroxide is shorter than 1 minute. More specifically, the kneading temperature is ordinarily 150° to 280° C. and preferably 170° to 240° C. The kneading time is ordinarily 1 to 20 minutes and preferably 3 to 10 minutes.

In the present invention, at the partial crosslinking treatment with the organic peroxide, there can be used peroxy-crosslinking assistants such as p-quinone dioxime, p,p'-dibenzoylquinone dioxime, N-methyl-N,N-dinitrosoaniline, nitrobenzene, diphenylguanidine, trimethylolpropane-N,N'-m-phenylene maleimide and N-methyl-N,N'-m-phenylene dimaleimide, divinylbenzene, triallyl isocyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate. It is expected that if such a compound as described above is used, the crosslinking reaction will be advanced uniformly and mildly. In the present invention, especially, if divinylbenzene is used, since divinylbenzene is easy to handle, has a good compatibility with the olefinic plastic as the main component to be treated and acts as a dispersing agent for the organic peroxide by its organic peroxide-solubilizing action, a uniform crosslinking effect is attained by the heat treatment and a composition which is well-balanced between the flowability and the physical properties can be obtained. Therefore, use of divinylbenzene is most preferred in the present invention. In the present invention, it is preferred that the above-mentioned crosslinking agent or polyfunctional vinyl monomer be incorporated in an amount of 0.1 to 2% by weight, especially 0.3 to 1% by weight, based on the total amount of the components to be treated.

If the crosslinking agent or polyfunctional vinyl monomer is incorporated in an amount within the above-mentioned range, the flowability of the composition is improved, and even if the composition undergoes heat history, the physical properties are not changed.

A decomposition promotor may be incorporated so as to promote decomposition of the organic peroxide. As the decomposition promotor, there can be mentioned tertiary amines such as triethylamine, tributylamine and 2,4,6-tris(dimethylamino)phenol, and naphthenic acid salts of metals such as aluminum, cobalt, vanadium, manganese, magnesium, lead and mercury.

It is preferred that kneading be carried out in a closed apparatus in an atmosphere of an inert gas such as nitrogen or carbon dioxide gas. The kneading temperature is such that the half-value period of the used organic peroxide is shorter than 1 minute. More specifically, the kneading temperature is ordinarily 150° to 280° C. and preferably 170° to 240° C. The kneading time is ordinarily 1 to 20 minutes and preferably 1 to 10 minutes. The shearing force is selected so that the shearing speed is ordinarily 10 to $10^4$ sec$^{-1}$ and preferably $10^2$ to $10^3$ sec$^{-1}$.

As the kneading device, there can be mentioned a mixing roll, an intensive mixer such as a Banbury mixer, a kneader and a monoaxial or biaxial extruder, and use of a closed kneading device is preferred.

According to the present invention, by the dynamic heat treatment in the presence of the organic peroxide, partial crosslinking is effected and a thermoplastic elastomer (a) graft-modified with the component (iii) is obtained.

Incidentally, in the present invention, by the term "partial crosslinking", it is meant that the gel content is at least 20%, preferably 20 to 99.5%, especially preferably 45 to 98%, as determined according to the following method.

Method for Determination of Gel Content

About 100 mg of a sample of a thermoplastic elastomer is weighed and cut into small pieces having a size of 0.5 mm×0.5 mm×0.5 mm, and the cut pieces are immersed in 30 ml of cyclohexane at 23° C. for 48 hours in a sealed vessel. Then, the sample is recovered on a filter paper and dried at room temperature for more than 72 hours until the weight is not changed any more.

The weight of the cyclohexane-insoluble components except the polymer component (for example, fibrous filler, filler, pigment and the like) and the weight of the olefinic plastic in the sample before immersion in cyclohexane are substracted from the weight of the drying residue. The obtained value is designated as "corrected final weight (Y)".

The weight of the peroxide-crosslinkable olefin copolymer in the sample (namely, the value obtained by subtracting ① the weight of olefinic plastic and ② the weight of the cyclohexane-soluble components other than the peroxide-crosslinkable olefin copolymer rubber (for example, mineral oil and plasticizer) and ③ the weight of the cyclohexane-insoluble components other than the polymer component (fibrous filler, filler, pigment and the like) from the weight of the sample) is designated as "corrected initial weight (X)".

The gel content is calculated according to the following formula:

$$\text{Gel content (\% by weight)} = \frac{\text{corrected final weight (Y)}}{\text{corrected initial weight (X)}} \times 100$$

Polyamide (b)

As the polyamide (b) used in the present invention, there can be mentioned polyamides obtained by polyamides obtained by polycondensing aliphatic, alicyclic and aromatic diamines such as hexamethylene diamine, decamethylene diamine, dodecamethylene diamine, 2,2,3-or 2,2,4-trimethylhexamethylene diamine, 1,3- or 1,4-bis(aminomethyl)cyclohexane, bis(p-aminocyclohexylmethane) and m- or p-xylylene diamine with aliphatic, alicyclic and aromatic dicarboxylic acids such as adipic acid, suberic acid, sebacic acid, cyclohexanedicarboxylic acid, terephthalic acid and isophthalic acid, polyamides obtained by condensing aminocarboxylic acids such as ε-aminocaproic acid and 11-aminoundecanoic acid, polyamides obtained from lactams such as ε-caprolactam and ω-laurolactam, copolyamides composed of these components and mixtures of these polyamides. As specific examples, there can be mentioned nylon 6, nylon 66, nylon 610 nylon 9, nylon 11, nylon 12, nylon 6/66, nylon 66/610 and nylon 6/11. Of these polyamides, nylon 6 and nylon 66 are preferred in view of the mechanical strength and heat resistance of the thermoplastic resin composition.

As the method for mixing the modified polyolefin elastomer (a) and the polyamide (b), there can be mentioned a method in which primary mixing is carried out by using a Henschel mixer, a V-blender, a ribbon blender or a tumbler blender and the blend is melt-mixed at a temperature higher than the melting point of the polyamide (b) by using a monoaxial extruder, a biaxial extruder, a kneader or a Banbury mixer and is then granulated or pulverized.

Thermoplastic Resin Composition (1)

In accordance with one preferred embodiment of the present invention, there is provided a thermoplastic resin composition (1) which comprises the graft-modified polyolefin elastomer (a) in an amount larger than 50 parts by weight but up to 95 parts by weight, preferably 60 to 90 parts by weight, and the polyamide (b) in an amount of from 5 to less than 50 parts by weight, preferably from 10 to 40 parts by weight, the sum of the amount so the components (a) and (b) being 100 parts by weight.

In this preferred resin composition (1), the interface of the blend between the polyamide and the modified polyolefin thermoplastic elastomer modified with an α,β-unsaturated carboxylic acid or derivative thereof such as maleic anhydride or an unsaturated epoxy monomer is highly reinforced, and therefore, the resin composition (1) is excellent in the oil resistance, the resistance against heat aging and the mechanical strength and the resin composition is preferably used for the production of automobile parts (such as bellows, tubes, interior sheets and mudguards), industrial parts (such as pressure-resistant hoses, gaskets and diaphragms), electronic and electric machine parts and construction materials.

Thermoplastic Resin Composition (2)

In accordance with another preferred embodiment, there is provided a thermoplastic resin composition (2) which comprises the graft-modified polyolefin elastomer (a) in an amount of from 5 to less than 50 parts by weight, preferably from 10 to 30 parts by weight, and the polyamide (b) in an amount larger than 50 parts by weight but up to 95 parts by weight, preferably from 70 to 90 parts by weight, the sum of the amounts of the components (a) and (b) being 100 parts by weight.

This thermoplastic resin composition (2) is excellent in the rigidity, impact strength, flowability and heat resistance.

The thermoplastic resin composition (2) can be molded as an impact-resistant resin according to known molding methods such as injection molding, extrusion molding, compression molding, hollow molding and foaming molding, and the thermoplastic resin composition (2) is suitably used for the production of pipes, pipe-coating materials, automobile parts, electric instrument parts, helmets and ski boots.

The present invention will now be described in detail with reference to the following examples that by no means limit the scope of the invention.

In the present invention, the content ratio between the components (i) and (ii) in the elastomer composition can be determined by the D.S.C. method or the infrared absorbency analysis method. The contents of the components (iv) and (v) in the composition can be determined by the solvent extraction method (Soxhlet extraction method using acetone as the solvent) or the infrared absorbance analysis method.

The content of the grafted component (iii) was measured by the infrared absorbance analysis method or the chemical analysis method.

EXAMPLE 1

A blend comprising 80 parts by weight of an ethylene/propylene/ethylidene-norbornene copolymer rubber having an ethylene content of 70 mole %, an iodine value of 12 and a Mooney viscosity $M_{1+4}$ (100° C.) of 120 hereinafter referred to as "EPDM (1)" and 20 parts by weight of polypropylene having a melt index (ASTM D-1238-65T, 230° C.) of 13 and a density of 0.91 g/cm$^3$ (hereinafter referred to as "PP") was kneaded at 180° C. for 5 minutes in a nitrogen atmosphere by a Banbury mixer, and the kneaded blend was passed through rolls and square pellets were prepared by a sheet cutter. Then, the so-obtained pellets were stirred and mixed with 0.3 part by weight of 1,3-bis(tert-butyl-peroxyisopropyle)benzene (hereinafter referred to as "peroxide (A)"), 0.5 part by weight of divinyl-benzene (hereinafter referred to as "DVB") and 0.5 part by weight of maleic anhydride (hereinafter referred to as "MAH") by a Henschel mixer. The mixture was extruded at 220° C. in a nitrogen atmosphere by a monoaxial extruder having an L/D ratio of 30 and a screw diameter of 50 mm to prepare a graft-modified polyolefin elastomer (a). The gel content of the copolymer rubber in the modified polyolefin elastomer (a) was determined according to the above-mentioned method. The measured value is shown in Table 1.

Then, 85 parts by weight of the modified polyolefin elastomer (a) and 15 parts by weight of a polyamide (Nylon 6 A1030BRF supplied by Unitica) were extruded at 250° C. in a nitrogen atmosphere by a monoaxial extruder having an L/D ratio of 30 and a screw diameter of 50 mm. The obtained thermoplastic elastomer composition was compression-molded to obtain a sheet for determination of the physical properties. The following physical properties described below were measured. The obtained results are shown in Table 1.

Oil resistance ($\Delta V$, %):
According to JIS K-6301, the sample was immersed in JIS Oil No. 3 at 50° C. for 7 days, and the increase ratio (%) of the volume by immersion was measured.

Strength ($T_B$, Kgf/cm$^2$):
According to JIS K-6301, the sample was pulled at a pulling speed of 200 mm/min and the tensile strength at break was measured.

Softness (torsion rigidity, Kgf/cm$^2$):
The torsion rigidity was determined according to the method of ASTM D-1043.

Moldability (MFR, g/10 min):

The melt flow rate was measured at 230° C. under a load of 2.16 kg according to ASTM D-1238.

Resistance to heat aging $A_R$ ($E_B$), %:
According to JIS K-6301, the sample was allowed to stand in a gear oven at 135° C. for 7 days, and the ratio of the elongation at break after the aging treatment to that before the aging treatment (retention ratio, %) was measured.

COMPARATIVE EXAMPLE 1

The procedures of Example 1 were repeated in the same manner except that the amount incorporated of maleic anhydride was changed to zero.

EXAMPLE 2

The procedures of Example 1 were repeated in the same manner except that the amount of DVB was changed to zero and the amounts of the modified polyolefin elastomer (a) and the polyamide (b) were changed to 70 parts by weight and 30 parts by weight, respectively.

EXAMPLE 3

In a Henschel mixer, 80 parts by weight of a pelletized ethylene/propylene/ethylidene-norbornene copolymer rubber having an ethylene content of 70 mole %, an iodine value of 12 and a Mooney viscosity $M_{1+4}$ (100° C.) of 120 hereinafter referred to as "EPDM (2)", 20 parts by weight of PP, 0.3 part by weight of peroxide (A), 0.5 part by weight of MAH and 0.5 part by weight of DVB were stirred and mixed. The mixture was extruded at 220° C. in a nitrogen atmosphere by a biaxial extruder having an L/D ratio and a screw diameter of 53 mm to prepare a modified polyolefin elastomer (a). Then, the procedures of Example 1 were repeated in the same manner by using 55 parts by weight of the modified polyolefin elastomer (a) and 45 parts by weight of the polyamide (b).

EXAMPLES 4 AND 5 AND COMPARATIVE EXAMPLE 2

The procedures of Example 1 were repeated in the same manner except that the amount incorporated of peroxide (A) was changed to 0.6 part by weight, 1 part by weight or 1.5 parts by weight and the amounts of MAH, the modified polyolefin elastomer (a) and the polyamide (b) were changed as shown in Table 1.

EXAMPLES 6 THROUGH 9 AND COMPARATIVE EXAMPLE 3

The procedures of Example 3 were repeated in the same manner except that the amounts of EPDM (1) and PP were changed as shown in Table 1.

EXAMPLE 10

The procedures of Example 1 were repeated in the same manner except that at the step of forming the modified polyolefin elastomer (a), butyl rubber (IIR-065 supplied by Esso, unsaturation degree=0.8 mole %) (hereinafer referred to as "IIR") and a paraffinic process oil were incorporated in addition to EPDM (1) and PP as shown in Table 1, and the amounts of the modified polyolefin elastomer (a) and the polyamide (b) were changed as shown in Table 1.

EXAMPLE 11

The procedures of Example 10 were repeated in the same manner except that 0.5 part by weight of glycidyl methacrylate was incorporated instead of 0.5 part by weight of MAH.

EXAMPLES 12 AND 14

The procedures of Example 10 were repeated in the same manner except that the amounts of EPDM (1), PP, IIR, paraffinic process oil, MAH, modified polyolefin elastomer (a) and polyamide (b) were changed as shown in Table 1.

EXAMPLES 13 AND 15

The procedures of Example 11 were repeated in the same manner except that the amounts of EPDM (1), PP, IIR, paraffinic process oil, glycidyl methacrylate, modified polyolefin elastomer (a) and polyamide (b) were changed as shown in Table 1.

(Model IS-22P supplied by Toshiba Kikai, set temperature=240° C., mold temperature=80° C.), and the physical properties were determined according to the following methods.

Rigidity

The flexural test was carried out according to ASTM D-790, and a test piece having a size of 127 mm × 12.7 mm × 3.2 mm was used and the bending speed was 5 mm/min. The flexural modulus (FM, kg/cm$^2$) and the flexural stress (FS, kg/cm$^2$) were measured.

Strength

The tensile test was carried out according to ASTM D-638. A test piece of ASTM Type IV was used, and the pulling speed was 50 mm/min. The stress at yield

TABLE 1

| | E1 | R1 | E2 | E3 | E4 | E5 | R2 | E6 | E7 | E8 |
|---|---|---|---|---|---|---|---|---|---|---|
| Composition (parts of weight) of Modified Polyolefin Elastomer (a) | | | | | | | | | | |
| EPDM | 80 | 80 | 80 | 80 | 80 | 80 | 80 | 90 | 75 | 63 |
| Polypropylene | 20 | 20 | 20 | 20 | 20 | 20 | 20 | 10 | 25 | 37 |
| Butyl Rubber | — | — | — | — | — | — | — | — | — | — |
| Oil | — | — | — | — | — | — | — | — | — | — |
| Maleic Anhydride | 0.5 | 0 | 0.5 | 0.5 | 2 | 5 | 15 | 0.5 | 0.5 | 0.5 |
| Glycidyl Methacrylate | — | — | — | — | — | — | — | — | — | — |
| Gel Content (% by weight) | 93 | 90 | 94 | 94 | 96 | 98 | 98 | 90 | 85 | 80 |
| Composition (parts by weight) and Physical Properties of Thermoplastic Resin Composition | | | | | | | | | | |
| Modified Polyolefin Elastomer (a) | 85 | 85 | 70 | 55 | 85 | 85 | 85 | 85 | 85 | 85 |
| Polyamide (b) | 15 | 15 | 30 | 45 | 15 | 15 | 15 | 15 | 15 | 15 |
| Oil Resistance AV (%) | 75 | 190 | 45 | 5 | 76 | 78 | 75 | 80 | 70 | 65 |
| Strength T$_B$ (Kgf/cm$^2$) | 104 | 40 | 125 | 161 | 107 | 105 | 80 | 84 | 121 | 132 |
| Softness, Torsion Rigidity (Kgf/cm$^2$) | 105 | 100 | 350 | 620 | 101 | 105 | 100 | 92 | 280 | 560 |
| Moldability MFR (g/10 min.) | 1 | 5 | 5 | 30 | 0.8 | 0.5 | 0.05 | 0.7 | 1.5 | 20 |
| Resistance to Heat Aging, A$_B$ (E$_B$) (%) | 98 | 50 | 97 | 98 | 98 | 96 | 97 | 98 | 97 | 99 |
| | E9 | R3 | E10 | E11 | E12 | E13 | E14 | E15 | E28 | E29 |
| Composition (parts of weight) of Modified Polyolefin Elastomer (a) | | | | | | | | | | |
| EPDM | 40 | 8 | 80 | 80 | 70 | 70 | 60 | 60 | 80 | 60 |
| Polypropylene | 50 | 92 | 20 | 20 | 30 | 30 | 40 | 40 | 20 | 40 |
| Butyl Rubber | — | — | 10 | 10 | 15 | 15 | 20 | 20 | 10 | 20 |
| Oil | — | — | 30 | 30 | 40 | 40 | 40 | 40 | 30 | 40 |
| Maleic Anhydride | 0.5 | 0.5 | 0.5 | — | 1.0 | — | 0.5 | — | 0.5 | 0.5 |
| Glycidyl Methacrylate | — | — | — | 0.5 | — | 1.0 | — | 0.5 | — | — |
| Gel Content (% by weight) | 55 | 15 | 65 | 69 | 61 | 61 | 54 | 51 | 65 | 54 |
| Composition (parts by weight) and Physical Properties of Thermoplastic Resin Composition | | | | | | | | | | |
| Modified Polyolefin Elastomer (a) | 85 | 85 | 75 | 75 | 70 | 70 | 85 | 85 | 75 | 85 |
| Polyamide (b) | 15 | 15 | 25 | 25 | 30 | 30 | 15 | 15 | 25 | 15 |
| Oil Resistance AV (%) | 55 | 20 | 65 | 62 | 40 | 41 | 68 | 65 | 64 | 67 |
| Strength T$_B$ (Kgf/cm$^2$) | 185 | 203 | 100 | 103 | 120 | 123 | 130 | 133 | 101 | 135 |
| Softness, Torsion Rigidity (Kgf/cm$^2$) | 850 | >1000 | 280 | 283 | 380 | 387 | 524 | 525 | 290 | 520 |
| Moldability MFR (g/10 min.) | 25 | 35 | 6 | 6 | 9 | 9 | 27 | 28 | 5 | 25 |
| Resistance to Heat Aging, A$_B$ (E$_B$) (%) | 96 | 95 | 98 | 96 | 97 | 99 | 97 | 98 | 99 | 98 |

Note
E: Example
R: Comparative Example
*Hydroxypropylmethacrylate

EXAMPLE 16

A blend of 20 parts by weight of the graft-modified polyolefin elastomer (a) prepared in the same manner as described in Example 1 and 80 parts by weight of the same polyamide (Nylon 6 A1030BRF) as used in Example 1 was extruded at 250° C. in a nitrogen atmosphere by using a monoaxial extruder having an L/D ratio of 30 and a screw diameter of 50 mm to obtain a polyamide-rich resin composition.

The composition was dried and was formed into a test piece by using an injection molding machine (YS, kg/cm$^2$) and the tensile strength at yield (TS, kg/cm$^2$) were measured.

Impact Strength

The Izod impact strength test was carried out according to ASTM D-256. A notched test piece having a thickness of 3 mm was used.

Flowability

The melt flow rate test was carried out at 230° C. under a load of 2.16 kg according to ASTM D-1238.

COMPARATIVE EXAMPLE 4

The procedures of Example 16 were repeated in the same manner except that the amount incorporated of maleic anhydride was changed to zero.

EXAMPLE 17

The procedures of Example 16 were repeated in the same manner except that the amount of DVB was changed to zero and the amounts of the modified polyolefin elastomer (a) and the polyamide (b) were changed to 35 parts by weight and 65 parts by weight, respectively.

EXAMPLE 18

The procedures of Example 16 were repeated in the same manner except that 20 parts by weight of the modified polyolefin elastomer (a) prepared in the same manner as in Example 3 except that the amounts of peroxide (A) and MAH were changed to 0.6 parts by weight and 2 parts by weight, respectively, and 80 parts by weight of the polyamide (b) were used.

EXAMPLE 19

The procedures of Example 18 were repeated in the same manner except that the amount of peroxide (A) was changed to 1 part by weight and the amounts of MAH, the modified polyolefin elastomer (a) and the polyamide (b) were changed as shown in Table 2.

COMPARATIVE EXAMPLE 5

The procedures of Example 16 were repeated in the same manner except that the amount of EPDM (1) was changed to 100 parts by weight, PP was not incorporated, the amount of peroxide (A) was changed to 0.05 part by weight and DVB was not incorporated.

EXAMPLES 20 AND 21 AND COMPARATIVE EXAMPLE 6

The procedures of Example 18 were repeated in the same manner except that the amounts of EPDM (1) and PP were changed as shown in Table 2.

EXAMPLE 22

The procedures of Example 16 were repeated in the same manner except that at the step of forming the modified polyolefin elastomer (a), IIR and a paraffinic process oil were incorporated in addition to EPDM (1) and PP as shown in Table 2, and the amounts of the modified polyolefin elastomer (a) and the polyamide (b) were changed as shown in Table 2.

EXAMPLE 23

The procedures of Example 22 were repeated in the same manner except that 0.5 part by weight of glycidyl methacrylate was used instead of 0.5 part by weight of MAH.

EXAMPLE 24

The procedures of Example 22 were repeated in the same manner except that the amounts of EPDM (1), PP, IIR, paraffinic process oil, MAH, modified polyolefin elastomer (a) and polyamide (b) were changed as shown in Table 2.

EXAMPLE 25

The procedures of Example 23 were repeated in the same manner except that the amounts of EPDM (1), PP, IIR, paraffinic process oil, glycidyl methacrylate, modified polyolefin elastomer (a) and polyamide (b) were changed as shown in Table 2.

EXAMPLES 26 AND 27

The procedures of Example 23 were repeated in the same manner as in Example 23 except that EPDM (1), PP, IIR, paraffinic process oil, hydroxypropyl methacrylate, modified polyolefin elastomer (a) and polyamide were incorporated in amounts shown in Table 2.

EXAMPLE 28

The procedures of Example 10 were repeated in the same manner except that hydroxypropyl methacrylate was used instead of maleic anhydride.

EXAMPLE 29

The procedures of Example 14 were repeated in the same manner except that hydroxypropyl methacrylate was used instead of maleic anhydride.

TABLE 2

| | E16 | R4 | E17 | E18 | E19 | R5 | E20 | E21 |
|---|---|---|---|---|---|---|---|---|
| Composition (parts of weight) of Modified Polyolefin Elastomer (a) | | | | | | | | |
| EPDM | 80 | 80 | 80 | 80 | 80 | 100 | 90 | 63 |
| Polypropylene | 20 | 20 | 20 | 20 | 20 | — | 10 | 37 |
| Butyl Rubber | — | — | — | — | — | — | — | — |
| Oil | — | — | — | — | — | — | — | — |
| Maleic Anhydride | 0.5 | 0 | 0.5 | 2 | 5 | 0.5 | 0.5 | 0.5 |
| Glycidyl Methacrylate | — | — | — | — | — | — | — | — |
| Gel Content (% by weight) | 93 | 90 | 94 | 96 | 98 | 10 | 90 | 94 |
| Composition (parts by weight) and Physical Properties of Thermoplastic Resin Composition | | | | | | | | |
| Modified Polyolefin Elastomer (a) | 20 | 20 | 35 | 20 | 20 | 20 | 20 | 20 |
| Polyamide (b) | 80 | 80 | 65 | 80 | 80 | 80 | 80 | 80 |
| FM (Kg/cm$^2$) | 20000 | 19800 | 17100 | 20100 | 20100 | 17900 | 19900 | 20500 |
| FS (Kg/cm$^2$) | 737 | 730 | 610 | 750 | 755 | 630 | 730 | 750 |
| YS (Kg/cm$^2$) | 488 | 470 | 420 | 490 | 485 | 440 | 485 | 495 |
| TS (Kg/cm$^2$) | 565 | 550 | 510 | 570 | 565 | 515 | 550 | 585 |
| Izod Impact Strength (Kg · cm/cm) | | | | | | | | |
| 23° C. | N.B. | 15.6 | N.B. | N.B. | N.B. | N.B. | N.B. | N.B. |
| 0° C. | N.B. | 7.5 | N.B. | N.B. | N.B. | 15.5 | N.B. | N.B. |
| −20° C. | 20.5 | 6.7 | 55.3 | 22.3 | 21.5 | 12.5 | 30.6 | 15.3 |
| −40° C. | 15.4 | 5.9 | 25.0 | 16.5 | 15.8 | 10.0 | 20.8 | 12.6 |

TABLE 2-continued

| MFR (g/10 min.) | 2.7 | 0.2 | 2.1 | 2.5 | 2.0 | 0.5 | 2.3 | 3.5 |
|---|---|---|---|---|---|---|---|---|
| | | R6 | E22 | E23 | E24 | E25 | E26 | E27 |
| Composition (parts of weight) of Modified Polyolefin Elastomer (a) | | | | | | | | |
| EPDM | | 8 | 80 | 80 | 60 | 60 | 80 | 60 |
| Polypropylene | | 92 | 20 | 20 | 40 | 40 | 20 | 40 |
| Butyl Rubber | | — | 10 | 10 | 20 | 20 | 10 | 20 |
| Oil | | — | 30 | 30 | 40 | 40 | 30 | 40 |
| Maleic Anhydride | | 0.5 | 0.5 | — | 0.5 | — | — | — |
| Glycidyl Methacrylate | | — | — | 0.5 | — | 0.5 | 0.5* | 0.5* |
| Gel Content (% by weight) | | 90 | 65 | 69 | 54 | 51 | 73 | 54 |
| Composition (parts by weight) and Physical Properties of Thermoplastic Resin Composition | | | | | | | | |
| Modified Polyolefin Elastomer (a) | | 20 | 20 | 20 | 20 | 20 | 20 | 20 |
| Polyamide (b) | | 80 | 80 | 80 | 80 | 80 | 80 | 80 |
| FM (Kg/cm$^2$) | | 21000 | 19500 | 19700 | 20100 | 20200 | 19800 | 20300 |
| FS (Kg/cm$^2$) | | 760 | 730 | 745 | 760 | 765 | 750 | 765 |
| YS (Kg/cm$^2$) | | 500 | 480 | 480 | 490 | 495 | 490 | 500 |
| TS (Kg/cm$^2$) | | 595 | 560 | 555 | 570 | 575 | 565 | 575 |
| Izod Impact Strength (Kg · cm/cm) | | | | | | | | |
| 23° C. | | N.B. | N.B. | N.B. | N.B. | N.B. | N.B. | N.B. |
| 0° C. | | 9.0 | N.B. | N.B. | N.B. | N.B. | N.B. | N.B. |
| −20° C. | | 7.3 | 60.5 | 55.3 | 60.1 | 60.7 | 56.0 | 61.5 |
| −40° C. | | 5.9 | 29.0 | 24.6 | 28.4 | 26.5 | 25.0 | 25.5 |
| MFR (g/10 min.) | | 4.0 | 3.0 | 3.5 | 4.5 | 4.6 | 3.7 | 4.5 |

Note
E: Example
R: Comparative Example
N.B.: not broken
*Hydroxypropylemethacrylate

We claim:

1. A thermoplastic resin composition which comprises (a) a partially crosslinked graft-modified polyolefin elastomer obtained by dynamically heat-treating a blend comprising (i) 60 to 95 parts by weight of a peroxide cross-linkable ethylene/α-olefin/non-conjugated diene copolymer rubber, the flowability of which is reduced by heat kneading in the presence of an organic peroxide, (ii) 5 to 40 parts by weight of a polyolefin plastic, the flowability of which is improved by heat kneading in the presence of an organic peroxide, the sum of the amounts of the components (i) and (ii) being 100 parts by weight, (iii) 0.01 to 10 parts by weight of at least one monomer selected from the group consisting of (1) an unsaturated carboxylic acid or derivative thereof, (2) an unsaturated epoxy monomer and (3) an unsaturated hydroxy monomer, and (iv) 5 to 100 part by weight of a peroxide-non-crosslinkable rubbery substance per 100 parts by weight of the sum of the amounts of the components (i) and (ii), and (b) a polyamide.

2. A thermoplastic resin composition as set forth in claim 1, wherein the amount of the graft-modified polyolefin elastomer (a) is more than 50 parts by weight and up to 95 parts by weight and the amount of the polyamide (b) is from 5 to less than 50 parts by weight, the sum of the amounts of the components (a) and (b) being 100 parts by weight.

3. A thermoplastic resin composition as set forth in claim 1, wherein the amount of the graft-modified polyolefin elastomer (a) is from 5 to less than 50 parts by weight, and the amount of component (b) is from more than 50 parts by weight and up to 95 parts by weight, the sum of the amounts of the components (a) and (b) being 100 parts by weight.

4. A thermoplastic resin composition as set forth in claim 1 wherein the peroxide-crosslinkable ethylene/α-olefin/non-conjugated diene copolymer rubber (i) is an ethylene/propylene/5-ethylidene-2-norbornene/dicyclopentadiene quadripolymer.

5. A thermoplastic resin composition as set forth in claim 1 wherein component (iii) comprises (1) an unsaturated carboxylic acid or derivative thereof.

6. A thermoplastic resin composition as set forth in claim 1 wherein said blend comprises (i) 60 to 95 parts by weight of said peroxide-crosslinkable olefin copolymer rubber, (ii) 5 to 40 parts by weight of said polyolefin plastic, the sum of the amounts of the components (i) and (ii) being 100 parts by weight, (iii) 0.1 to 5 parts by weight of said at least one monomer; and (iv) 5 to 50 parts by weight of peroxide non-crosslinkable rubbery substance and further comprising (v) 5 to 80 parts of mineral oil as a softener.

7. A thermoplastic resin composition as set forth in claim 1, wherein the amount of the graft-modified polyolefin elastomer (a) is from 60 to 90 parts by weight and the amount of the polyamide (b) is from 10 to 40 parts by weight.

8. A thermoplastic resin composition as set forth in claim 1, wherein the amount of the graft-modified polyolefin elastomer (a) is from 10 to 30 parts by weight, and the amount of the polyamide (b) is from 70 to 90 parts by weight.

9. The composition of claim 1 wherein the composition further comprises (v) 3 to 200 parts by weight of a mineral oil as a softener per 100 parts by weight of the sum of the amounts of the components (i) and (ii).

* * * * *